(12) United States Patent
Papandreou et al.

(10) Patent No.: US 12,541,572 B2
(45) Date of Patent: Feb. 3, 2026

(54) ACCELERATING DECISION TREE INFERENCES BASED ON COMPLEMENTARY TENSOR OPERATION SETS

(71) Applicant: International Business Machines Corporation, Armonk, NY (US)

(72) Inventors: Nikolaos Papandreou, Thalwil (CH); Charalampos Pozidis, Thalwil (CH); Milos Stanisavljevic, Adliswil (CH); Jan Van Lunteren, Rüschlikon (CH); Thomas Parnell, Zürich (CH); Cedric Lichtenau, Stuttgart (DE); Andrew M. Sica, Oxford, CT (US)

(73) Assignee: International Business Machines Corporation, Armonk, NY (US)

( * ) Notice: Subject to any disclaimer, the term of this patent is extended or adjusted under 35 U.S.C. 154(b) by 1094 days.

(21) Appl. No.: 17/457,698

(22) Filed: Dec. 6, 2021

(65) Prior Publication Data

US 2023/0177120 A1     Jun. 8, 2023

(51) Int. Cl.
  *G06F 18/2323*  (2023.01)
  *G06F 18/2411*  (2023.01)
  *G06N 5/01*     (2023.01)

(52) U.S. Cl.
  CPC ...... *G06F 18/2323* (2023.01); *G06F 18/2411* (2023.01); *G06N 5/01* (2023.01)

(58) Field of Classification Search
  None
  See application file for complete search history.

(56) References Cited

U.S. PATENT DOCUMENTS 10,762,517 B2 *   9/2020   Vadakattu .............. G06N 5/01
2007/0053563 A1   3/2007   Tu
(Continued)

FOREIGN PATENT DOCUMENTS

CN    105389585 A    3/2016
CN    111125628 A    5/2020
(Continued)

OTHER PUBLICATIONS

Dudek et al., "Efficient Contraction of Large Tensor Networks for Weighted Model Counting Through Graph Decompositions", ARxIV:190804381V2 [CS.Ds], Apr. 27, 2020, 31 Pgs.
Jiang et al., "Efficient Nonmyopic Bayesian Optimization via One-Shot Multi-Step Trees", ARxIV:2006.15779V1 [cs.LG], Jun. 29, 2020, p. 16.
Lin et al., "Hard-ODT: Hardware-Friendly Online Decision Tree Learning Algorithm and System", IEEE Dec. 11, 2020, arXiv:2012.06272v1 [csLG], 14 Pgs.
(Continued)

*Primary Examiner* — Haimei Jiang
*Assistant Examiner* — Thomas Bernard Lane
(74) *Attorney, Agent, or Firm* — Stephen R. Yoder

(57) ABSTRACT

A tensor representation of a machine learning inferences to be performed is built by forming complementary tensor subsets that respectively correspond to complementary subsets of one or more leaf nodes of one or more decision trees based on statistics of the one or more leaf nodes of the one or more decision trees and data capturing attributes of one or more split nodes of the one or more decision trees and the one or more leaf nodes of the decision trees. The complementary tensor subsets are ranked such that a first tensor subset and a second tensor subset of the complementary tensor subsets correspond to a first leaf node subset and a second leaf node subset of the complementary subsets of the one or more leaf nodes.

19 Claims, 9 Drawing Sheets

(56) References Cited

U.S. PATENT DOCUMENTS

| | | | | |
|---|---|---|---|---|
| 2007/0253624 | A1* | 11/2007 | Becker | G06F 18/28 382/225 |
| 2011/0307423 | A1* | 12/2011 | Shotton | G06N 20/00 706/12 |
| 2013/0339158 | A1* | 12/2013 | Xie | G06Q 30/0248 705/14.73 |
| 2015/0117450 | A1* | 4/2015 | Thibaut | H04L 45/64 370/392 |
| 2017/0061327 | A1* | 3/2017 | Dong | G06N 5/025 |
| 2019/0197141 | A1 | 6/2019 | Gomez | |
| 2020/0167654 | A1 | 5/2020 | Guo | |
| 2020/0258057 | A1* | 8/2020 | Farahat | G06N 20/20 |
| 2020/0311613 | A1 | 10/2020 | Ma | |
| 2020/0377105 | A1 | 12/2020 | Murashkin | |
| 2023/0177351 | A1 | 6/2023 | Papandreou et al. | |

FOREIGN PATENT DOCUMENTS

| | | |
|---|---|---|
| CN | 111798003 A | 10/2020 |
| CN | 111639243 B | 3/2021 |
| CN | 111898694 A | 9/2021 |
| CN | 108388904 B | 5/2022 |
| WO | 2020050886 A1 | 3/2020 |
| WO | 2023/105348 A1 | 6/2023 |
| WO | 2023/105359 A1 | 6/2023 |

OTHER PUBLICATIONS

Nakandala et al., "A Tensor Compiler for Unified Machine Learning Prediction Serving", Oct. 19, 2020, arXiv:2010.04804v3 [cs.LG], 19 Pgs.

Owaida et al., "Scalable Inference of Decision Tree Ensembles: Flexible Design for CPU-FPGA Platforms", Sep. 4, 2017, 10.23919/FPL.2017.8056784, IEEEE Xplore, 8 Pgs.

IBM Appendix P., "List of IBM Patents or Patent Applications to be Treated as Related", Dated Herewith, 2 pages.

Papandreou et al;, "Accelerating Decision Tree Inferences Based On Complementary Tensor Operation Sets", Filed Dec. 6, 2021, U.S. Appl. No. 17/457,698, 37 Pgs.

"Patent Cooperation Treaty PCT Notification of Transmittal of the International Search Report and the Written Opinion of the International Searching Authority, or the Declaration", International application No. PCT/IB2022/061580, International filing date Nov. 30, 2022, Priority Date Dec. 6, 2021, 6 pages.

"Patent Cooperation Treaty PCT Notification of Transmittal of the International Search Report and the Written Opinion of the International Searching Authority, or the Declaration", International application No. PCT/IB2022/061647, International filing date Dec. 1, 2022, Priority Date Dec. 6, 2021, 6 pages.

Essen et al., "Accelerating a Random Forest Classifier: Multi-Core, GP-GPU, or FPGA?", 2012 IEEE 20th International Symposium on Field-Programmable Custom Computing Machines, Jul. 2012, 10 pages, https://ieeexplore.ieee.org/document/6239820.

* cited by examiner

| N7 | N8 | N4 | N5 | N6 |
|----|----|----|----|----|
| 40% | 25% | 20% | 10% | 5% |

FIG. 4A $C_1$:

| N7 | N8 |
|----|----|
| -1 | -1 |
| 0  | 0  |
| 1  | -1 |
| -1 | 0  |

$C_2$:

| N4 | N5 | N6 |
|----|----|----|
| 1  | 1  | -1 |
| 1  | -1 | 0  |
| 0  | 0  | 1  |
| 0  | 0  | 1  |

FIG. 4B $D_1$:

| N7 | N8 |
|----|----|
| 1  | 0  |

$D_2$:

| N4 | N5 | N6 |
|----|----|----|
| 2  | 1  | 2  |

FIG. 4C $E_1$:

| | | |
|---|---|---|
| 1 | 0 | N7 |
| 1 | 0 | N8 |

$E_2$:

| | | |
|---|---|---|
| 1 | 0 | N4 |
| 0 | 1 | N5 |
| 0 | 1 | N6 |

FIG. 5B

ACCELERATING DECISION TREE INFERENCES BASED ON COMPLEMENTARY TENSOR OPERATION SETS

BACKGROUND

The invention relates in general to the field of computer-implemented methods, computer program products, and computerized systems for accelerating decision tree inferences. In particular, the invention is directed to iterative methods executing the decision trees using tensor operations, which are decomposed into tensor operation subsets, where such subsets are ranked according to leaf node statistics.

Decision tree learning is a predictive modelling approach used in machine learning. It relies on one or more decision trees, forming the predictive model. Decision trees are widely used machine learning algorithms, owing to their simplicity and interpretability. Different types of decision trees are known, including classification trees and regression trees. A binary decision tree is basically a structure involving coupled decision processes. Starting from the root, a feature is evaluated, and one of the two branches of the root node is selected. This procedure is repeated until a leaf node is reached, a value of which is used to assemble a final result.

Random forest and gradient boosting are important machine learning methods, which are based on binary decision trees. In such methods, multiple decision trees are "walked" in parallel until leaf nodes are reached. The results taken from the leaf nodes are then averaged (regression) or used in a majority vote (classification). Such computations can be time and resource consuming, hence a need to accelerating tree-based inference, notably for ensemble models such as random forest and gradient boosting methods.

SUMMARY

According to a first aspect, the present invention is embodied as a computer-implemented method of performing machine learning inferences. The aim is to obtain inference results on a set of input records based on several decision trees. The method first comprises accessing statistics on leaf nodes of the decision trees, as well as data capturing attributes of split nodes and the leaf nodes of the decision trees. Next, the method builds, based on the data accessed, a tensor representation of the machine learning inferences to be performed. This is achieved by forming complementary tensor subsets that respectively correspond to complementary subsets of the leaf nodes of the decision trees. The complementary tensor subsets formed are ranked such that a first tensor subset and a second tensor subset of the complementary tensor subsets correspond to a first leaf node subset and a second leaf node subset of the complementary leaf node subsets, respectively. The leaf nodes of the first leaf node subset are more likely to be reached than the leaf nodes of the second leaf node subset, according to the statistics accessed. Then, the method processes all of the input records of the set of input records by performing tensor operations on the first tensor subset. This causes to obtain first inference results for a first subset of the set of input records. The first inference results are obtained in accordance with leaf nodes of the first leaf node subset. Some input records will likely remain, for which no inference result has yet been obtained. The remaining input records form a second subset of the set of input records. Thus, the method subsequently processes all of the input records of the second subset by performing the tensor operations on the second tensor subset. This causes to obtain second inference results for the second subset of the input records, this time in accordance with leaf nodes of the second leaf node subset. Further iterations may similarly be performed, should more than two complementary tensor subsets be formed, initially.

According to another aspect, the invention is embodied as a computerized system for performing machine learning inferences. The context is the same as in the above method. The computerized system comprises processing means, which are configured to perform steps as described above, i.e., access statistics on leaf nodes and data capturing attributes of the nodes of the decision trees, accordingly build a tensor representation of the problem by forming complementary tensor subsets, and process the input records by performing operations on the first tensor subset and then on the second tensor subset. The processing means of the computerized system preferably comprise one or more hardware accelerators, such as a dedicated chip, designed for tensor operations.

According to a final aspect, the invention is embodied as a computer program product for performing machine learning inferences. The computer program product comprises a computer readable storage medium having program instructions embodied therewith, where the program instructions are executable by processing means to cause the latter to perform steps according to the present methods.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings:

FIGS. 4A, 4B, 4C, and 4D are further diagrams illustrating how the tensor representation can be decomposed into complementary tensor subsets, as in embodiments;

FIGS. 5A and 5B are further diagrams illustrating how the tensor representation can be decomposed into complementary tensor subsets, as in embodiments;

The accompanying drawings show simplified representations of devices or parts thereof, as involved in embodiments. Similar or functionally similar elements in the figures have been allocated the same numeral references, unless otherwise indicated.

Computerized systems, methods, and computer program products embodying the present invention will now be described, by way of non-limiting examples.

DETAILED DESCRIPTION OF EMBODIMENTS OF THE INVENTION

Several approaches have been proposed to accelerate tree-based inferences, by optimizing hardware and/or algorithmic characteristics. In general, accelerating tree-based inferences is achieved by speeding up either (i) the individual decision tree processing, and/or (ii) the parallel processing of multiple decision trees.

For example, a method has been proposed, which allows decision trees to be executed by way of tensor operations. I.e., the evaluation of a decision tree is cast as a series of three matrix multiplication operations interleaved by two element-wise logical operations.

Figure 3A:
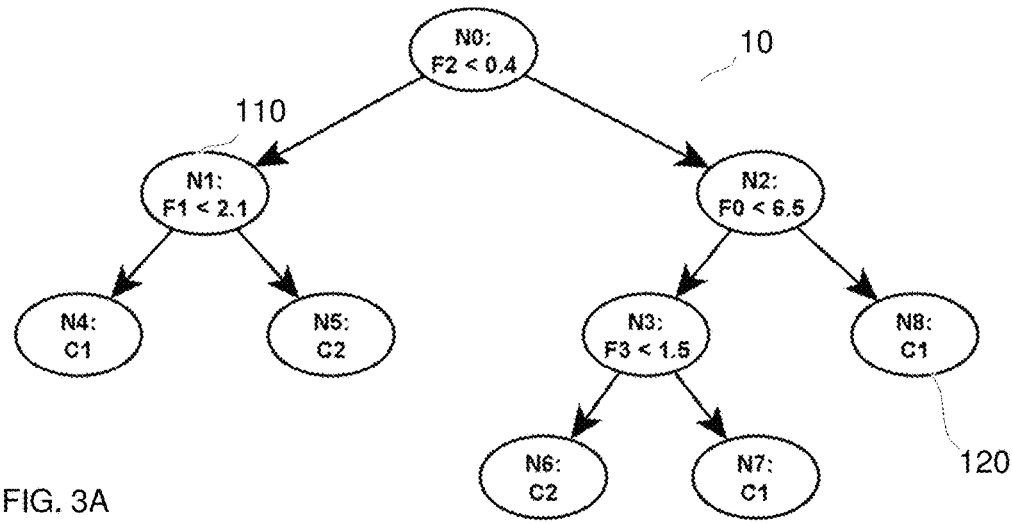
FIGS. 3A and 3B illustrate how the evaluation of a decision tree (FIG. 3A) can be cast as a series (FIG. 3B) of three matrix multiplication operations interleaved by two element-wise logical operations, according to a prior art technique. Although the decision tree-processing illustrated in FIG. 3B is not according to the invention, it is nevertheless useful to understand concepts involved in embodiments of the invention.
Figure 3B:
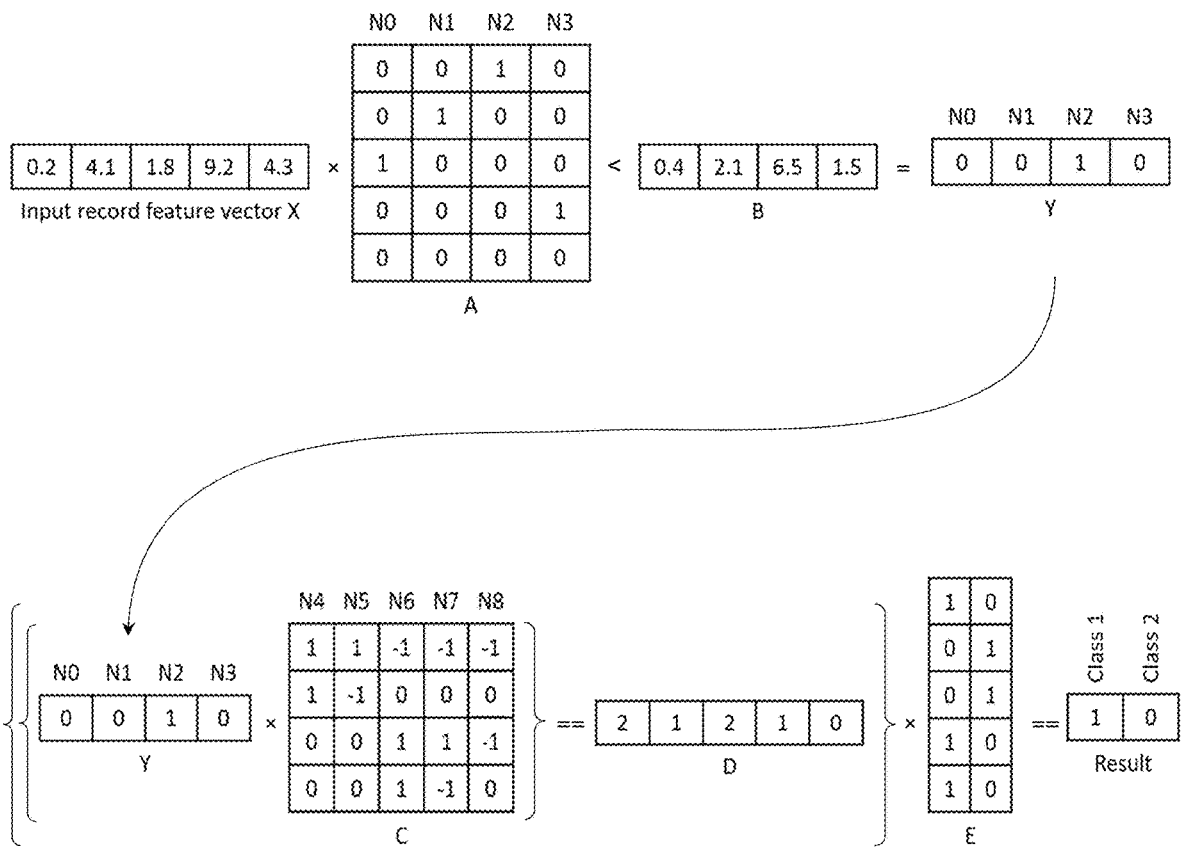

In detail, the tensor operations are decomposed into five operations for each input record and each decision tree. These operations make use of five matrices (A, B, C, D, and E) representing the structure of the decision tree. FIG. 3B shows how the decision tree 10 of FIG. 3A can be evaluated based on the above matrices for a given input record. The vector X captures feature values of this input record. The matrix A captures relationship between input features and split nodes (also called internal nodes) of the tree 10. The number of columns of matrix A corresponds to the number of split nodes of the tree 10. In the purposely simple example of FIG. 3A, the tree considered has only four split nodes N0, N1, N2, and N3, which result in four columns for matrix A. Vector B includes comparands which are set to the threshold values of the split nodes of the tree 10. Matrix C captures, for any leaf node and internal node pair, whether the internal node is a parent of that leaf node, and if so, whether it is in the left or right subtree. The number of columns of matrix C corresponds to the number of leaf nodes of the tree 10. In the example of FIG. 3A, the tree considered has five leaf nodes N4, N5, N6, N7, and N8, which result in five columns for matrix C. Vector D includes second comparands, each corresponding to the count of internal nodes in the path from a respective leaf node to the tree root, for which the internal node is the left child of its parent. Matrix E maps leaf nodes to class labels.

Using matrices as described above, the tensor operations can be decomposed into a sequence of five operations for each input record and each decision tree. Such operations start with a dot product of the row vector X by the matrix A, see FIG. 3B. This yields a first result (a row vector), which is subsequently compared (second operation) to the row vector B. This leads to a second result, captured by row vector Y. The third operation is a dot product of the row vector Y by matrix C. This yields a third result (another row vector), which is compared (fourth operation) with the row vector D. This provides a fourth result, i.e., a row vector Z, not explicitly shown in FIG. 3B. The last operation is a dot product of the row vector Z by the matrix E, which results in a fifth result (a row vector). The fifth result represents an inference result, corresponding to the outcome of executing the tree 10 with respect to the input record X.

The technique is appealing as it allows decision trees to be executed as a set of tensor operations. However, a direct application of such tensor operations to large numbers of input records and decision trees (as typically involved in ensemble models) will remain computationally costly.

Embodiments of the present invention provide for tensor operations can advantageously be offloaded to a hardware accelerator. Such operations may for instance be offloaded to a dedicated chip, which is specifically designed to perform tensor operations.

A first aspect of the invention is now described in detail in reference to FIGS. 1-7. This aspect concerns a computer-implemented method. Note, this method and its variants are collectively referred to as the "present methods" in this document. All references Sn refer to methods steps of the flowcharts of FIGS. 7 and 8, while numeral references pertain to mathematical objects, corresponding data structures (See FIGS. 1-6B), or physical parts or components of the unit and system shown in FIGS. 9 and 10.

The method aims at performing machine learning inferences based on decision trees. The context assumed is one where a set of input records are to be processed through several decision trees. In the present context, inferences are meant to be performed by way of tensor operations. A tensor is an algebraic object that can be represented as a multidimensional array. This object describes relationships between sets of algebraic objects related to a given vector space. A tensor may for instance map a vector (a 1-dimensional tensor) or a matrix (a 2-dimensional tensor). Here, the tensor operations performed rely on tensor sets, which map collections of vectors and/or matrices, from which operands are extracted to perform the tensor operations.

Several types of tensor operation decompositions can be contemplated. Other, albeit similar, tensor decompositions may be devised, as the skilled person may realize. For instance, the matrices may be adapted to non-binary trees and map more than two classes. The matrices may further be adapted to form predictions instead of classifications. Such tensor decompositions make it possible to process each input record through each of the decision trees, using tensor operations involving node attributes of all of the decision trees involved, in their entirety. As one understands, this can remain computationally costly when large numbers of input records and decision trees are involved. With this problem in mind, the present inventors have devised novel and improved techniques to perform machine learning inferences.

Namely, the approach proposed by the present inventors makes use of complementary subsets of tensors, which are suitably ordered and successively used to perform tensor operations. This makes it possible to achieve more efficient computations, as now explained in detail.

Figure 1:
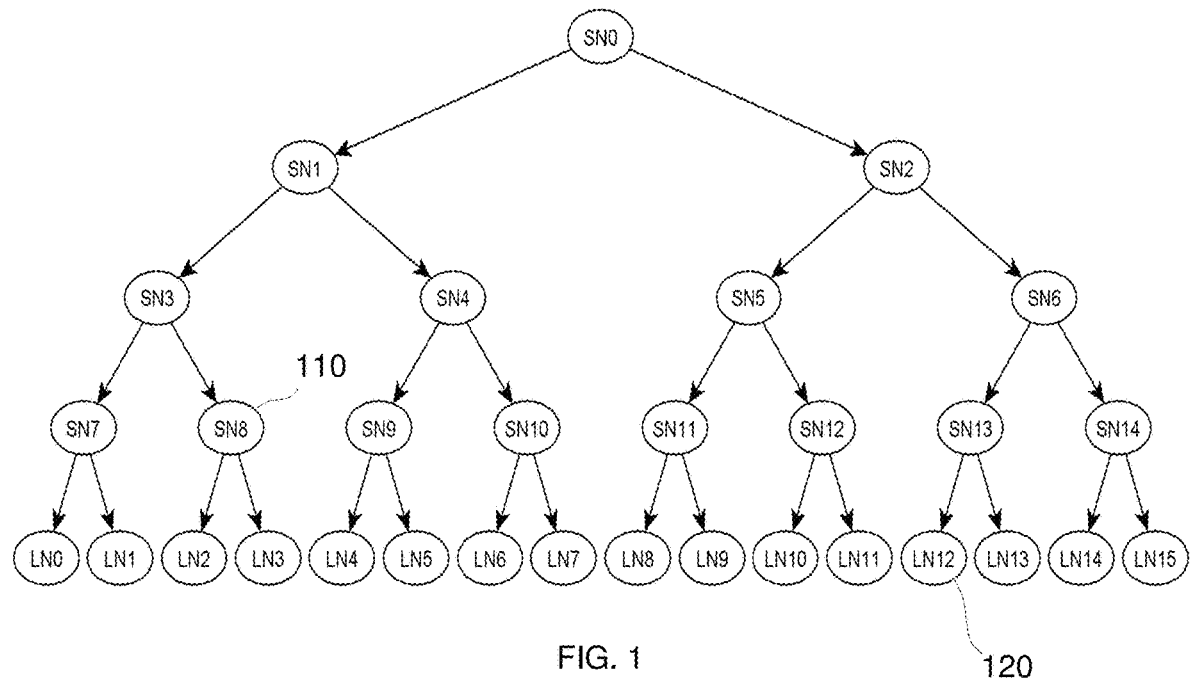
FIG. 1 illustrates a binary decision tree, which includes split nodes and leaf nodes, as involved in embodiments.

For example, assume that K input records are to be processed through N decision trees, where $K \geq 2$ and $N \geq 2$. Note, however, that much larger numbers of input records (100s to 1000s) and decision trees (100s to 1000s) will typically be involved in practice. Typically, the decision trees involved are binary decision trees, as assumed in embodiments described below. Examples of such decision trees are shown in FIGS. 1 and 3A. Each decision tree $T_i$ of the N decision trees has nodes 110, 120 extending from a root node to leaf nodes and, this, across $L_i$ levels. The decision trees do not necessarily all have the same number of levels. The nodes include split nodes 110 (also known as internal nodes) and leaf nodes 120. The split nodes 110 are also denoted by references SN0 (corresponding to the root node) to SN14, while the leaf nodes 120 are denoted by references LN0 to LN15 in the example of FIG. 1.

Figure 2:
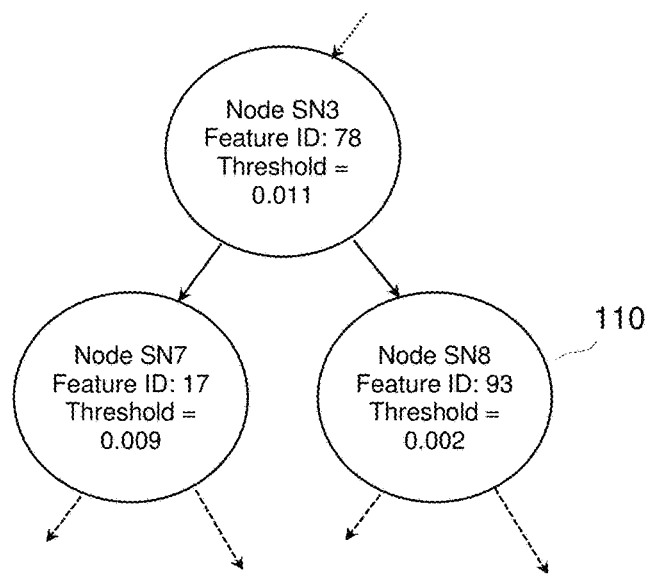
FIG. 2 shows a selection of split nodes of the decision tree of FIG. 1, together with node attributes (feature identifiers and threshold values), which are used to execute such nodes in embodiments.

Each node has attributes, which include operands (as required to execute the nodes), feature identifiers (also called feature selectors), and thresholds (used for comparisons). More generally, the node attributes may include all arguments/parameters needed for evaluating the rules captured by the decision tree nodes. Each split node of a decision tree is labelled with a feature identifier and is associated with a threshold to perform an operation, whereby, e.g., a feature value corresponding to a feature identifier is compared to a threshold, as known per se. This is illustrated in FIG. 2, which depicts selected split nodes 110 of the tree shown in FIG. 1, together with respective feature identifier values ("feature ID") and threshold values.

Various data are accessed at step S20 (see the flowchart of FIG. 7), with a view to performing tensor operations. The accessed data include attributes of the split nodes 110 and the leaf nodes 120 of the decision trees 10. They further include statistics on the leaf nodes 120 of the decision trees. Note, the feature values of the input records may possibly be accessed at step S20 too. The data accessed may initially be stored as arrays, capturing vectors, matrices, and/or tensors. For example, the feature values of the input records may be provided in the form of arrays capturing vectors or a collection of such vectors. The data accessed at step S20 are used as operands for the subsequent operations, starting with the tensor operations.

A tensor representation of the machine learning inferences is subsequently built at step S30, based on the data accessed. That is, the method populates one or more data structures capturing operands in the form of tensors, with a view to performing operations associated with this tensor representation. However, here the tensor representation involves complementary tensor subsets, using the statistics on the leaf nodes 120 of the trees. That is, the complementary tensor subsets respectively correspond to complementary subsets of the leaf nodes of the trees, where the tensor subsets are ranked in accordance with the statistics accessed.

Two or more tensor subsets may thus be formed. They may for instance include a first tensor subset and a second tensor subset, which correspond to a first leaf node subset and a second leaf node subset of the complementary leaf node subsets, respectively. The complementary leaf node subsets are assumed to be sorted in such a manner that the leaf nodes of the first leaf node subset are more likely to be reached than the leaf nodes of the second leaf node subset, according to the statistics accessed.

Having formed such complementary subsets, the method can then process (step S40, including steps S42-S44) all of the input records of the initial set of records, albeit in a gradual manner. That is, the method first performs tensor operations on the first tensor subset. I.e., all input records are first processed thanks to the first tensor subset. This causes to obtain first inference results for a first subset of the set of input records. Note, the results obtained so far are results obtained in accordance with leaf nodes of the first leaf node subset only. That is, not all inference results may be available yet, such that the first inference results obtained may pertain to only a first subset of the input records. On rare occasions, the results obtained after the first iterations may cover all of the input records; this will depend on the input records considered vs. the complementary subsets formed. This means that some input records will likely remain, for which no inference result has yet been obtained.

The remaining input records form a second subset of the initial set of input records. The second subset of records is identified at step S50. All of the input records of the second subset, if any (step S60: Yes), are subsequently processed during a second iteration (steps S42-S44), this time by performing the tensor operations on the second tensor subset. This causes to obtain second inference results for the second subset of the input records. The second inference results are, this time, obtained in accordance with leaf nodes of the second leaf node subset.

In other words, the method first builds a tensor representation of the problem to be solved, where the tensor representation is decomposed into simpler subproblems. Namely, complementary tensor subsets are formed, e.g., by reordering columns of an initial tensor representation and splitting the reordered columns according to a threshold value, as in embodiments discussed below.

Note, "complementary tensor subsets" means that at least some of the vectors, matrices, etc., involved in each of these tensor subsets form disjoint sets that complement each other. Thus, no information is lost. Still, additional tensors may be involved, beyond the sole complementary tensors. For example, an initial tensor representation may aggregate matrices such as matrices A, B, C, D, and E, as described in the background section. In this case, the complementary tensors may for instance be formed by splitting the matrices C, D, and E into complementary matrices, while keeping matrices A and B unchanged, for reasons that will become apparent later.

According to the proposed solution, the subsets of complementary tensor operations are ranked in order of their likelihood of use, based on the statistics on the leaf nodes of the initial decision trees. For example, such statistics may reflect a propensity of the leaf nodes to be reached upon running the decision trees. Such statistics can notably be based on the numbers of times the leaf nodes are reached upon running the decision trees. More generally, such statistics may be statistics on decision paths in the decision trees, which can nevertheless be translated to statistics as to the sole leaf nodes. Such statistics are typically obtained while training the decision trees, although they may be refined or updated during validations or inferences, as discussed later.

The tensor representation used to perform the iterative process described earlier may involve only two complementary tensor representations. In variants, additional tensor operation subsets may possibly be formed, if necessary. This way, several iterations S40 are gradually performed across the successive tensors, as necessary to obtain inference results for all of the input records. Initially, all of the input records are processed against the first tensor subset; this corresponds to the first iteration S40. However, because this tensor subset captures decision tree paths leading to a subset of the leaf nodes, only a subset of the inference results will likely be obtained. As a result, a first set of inference results will likely be obtained for only a first subset of the input records. That is, there will likely be residual input records, for which no inference result has yet been obtained. These form a second subset of input records. The residual input records can be run across the second tensor subset, and so on, until all inference results are obtained.

The present approach allows the tensor representations to be split into simpler tensor operations, albeit equivalent in the sense that they eventually allow the same results to be achieved (there is no approximation made). These tensor operations are successively performed, for gradually smaller numbers of input records, given that inference results will likely be obtained for most of the input records considered at each pass. In other words, the proposed approach relies on an iterative process, which is less demanding, computationally speaking, and therefore more time efficient than a direct execution.

The present approach can advantageously be applied to ensemble models, including Gradient Boosting and Random Forests. That is, the N decision trees involved may form part of an ensemble model. In that case, the machine learning inferences are performed to obtain an ensemble result for each of the input records. E.g., each of the N decision trees may be a binary classification tree and each ensemble result obtained may be a binary classification result. Still, the present approach can be extended to support multi-class and regression tasks. Each of the N decision trees may thus be a binary tree, but each ensemble result obtained may be a regression result. Where tree ensembles are involved, matrices similar to matrices A, B, C, D, and E can be created for each tree of the ensemble and batched to produce 3D tensors. As the number of leaf nodes and internal nodes may vary from one tree to the other, the 3D tensor dimensions are determined by the maximum number of leaf nodes and internal nodes of all of the trees involved, while smaller matrix slices are padded with zeros. Thus, global tensors can be used, which can be zero-padded, where necessary.

Moreover, the present methods can advantageously leverage hardware accelerators to perform the tensor operations. That is, the tensor operations may be offloaded to a hardware accelerator for execution, at each iteration. This accelerator may for instance include a dedicated chip, specifically designed to perform tensor operations such as matrix operations. In variants, the accelerator may include field programmable gate arrays (FPGAs). In both cases, offloading the tensor operations to specialized hardware results in substantially improving the time efficiency of the computations.

As said, the data accessed at step S20 may further capture feature values of the input records. In embodiments, the tensor representation is built according to arrays populated S25 based on the data accessed at step S20. Such arrays may notably reflect collections of vectors and matrices A, B, C, D, E, and X, corresponding to each of the input records and decision trees involved, as discussed earlier in reference to FIGS. 3A and 3B.

It is convenient to distinguish three types of arrays, hereafter referred to as first, second, and third arrays. The reason for doing so is that some of the data accessed relate to input records, while other data relate to decision trees. Now, only a subset of tree-related data need be split, hence the need to distinguish among three types of arrays.

The present methods will preferably seek to populate S25 first arrays with feature values of the input records. I.e., elements of the first arrays correspond to feature values of the input records; the first arrays aggregate values corresponding to vectors such as the row vector X in the example of FIG. 3B. The second arrays may notably include values formed from attributes of the split nodes of the decision trees; this corresponds to matrix A in the example of FIG. 3B. The second arrays may further include comparands, corresponding to vector B in the example of FIG. 3B. The third arrays may notably include attributes of the leaf nodes of the initial decision trees; they may for instance aggregate values corresponding to the matrices C and E, and the vector D, in the example of FIG. 3B. Note, such vectors and matrices are collectively referred to as matrices in the following.

The tensor operations can be executed based on data (e.g., operands) stored in arrays as described above. The arrays involved can have various dimensions. Such dimensions are determined by the number of the input records, the numbers of features associated with the input records, the number of trees involved, and the numbers of nodes in the trees. In embodiments, the tensor operations are executed based on the first and the second arrays, as well as complementary tensor subsets, where the latter are formed according to the third arrays, as illustrated below.

For example, the columns of the second arrays (matrices A, B) may correspond to split nodes, while the columns of the third arrays corresponding to matrices C and D may correspond to leaf nodes of the decision trees, like, the rows of the third arrays corresponding to matrix E. E.g., the columns of some of the third arrays may notably capture decision paths to the leaf nodes.

Now, such columns or rows capturing decision paths to the leaf nodes can be re-ordered according to the available statistics, from the most probable path—to the least probable path. Using such definitions, the complementary tensor subsets may be obtained (step S30) by: (i) reordering the relevant columns or rows of the third arrays (corresponding to matrices C, D, and E) according to the statistics accessed (see FIG. 4A), and (ii) splitting the columns or rows of the third arrays (once reordered) to obtain complementary subarrays, as illustrated in FIGS. 4B, 4C, and 4D. Note, the matrices shown in FIGS. 4A-4D correspond to a single decision tree, i.e., the tree 10 shown in FIG. 3A.

In general, splitting the third arrays amounts to split matrices C, D, and E, into two or more matrices C1, C2, etc., D1, D2, etc., and E1, E2, etc., for each decision tree involved. Only two groups of subarrays are formed in the example of FIGS. 4B-4D, for simplicity. In this case, the third arrays (C, D, and E) are split into first subarrays (C1, D1, and E1) and second subarrays (C2, D2, and E2). The first tensor subset can thus be formed based on the first subarrays (corresponding to matrices C1, D1, and E1). Similarly, the second tensor subset can be formed based on the second subarrays (corresponding to matrices C2, D2, and E2). In other words, the tensor operations are executed based on: the first arrays (corresponding to vector X in FIG. 3B); the second arrays (corresponding to matrices A, B in FIG. 3B); and the complementary tensor subsets, where the complementary tensor subsets are formed according to the third arrays, which are split into subarrays (corresponding to C1, C2, D1, D2, E1, E2 in FIGS. 4B, 4C, 4D). The above example illustrates how a tensor representation can be obtained based on suitably separated arrays.

Figure 5A:
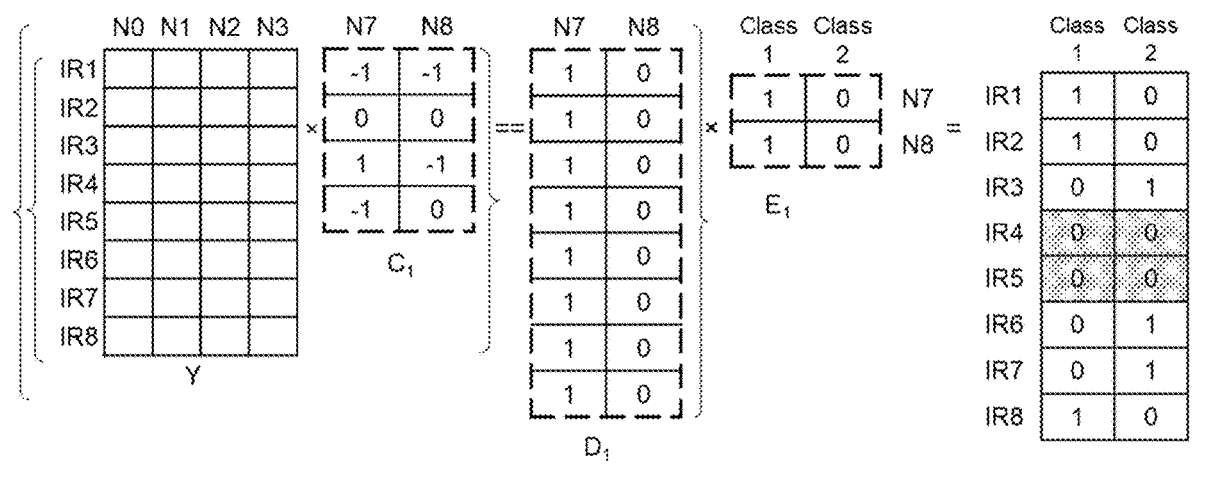
Figure 5B:
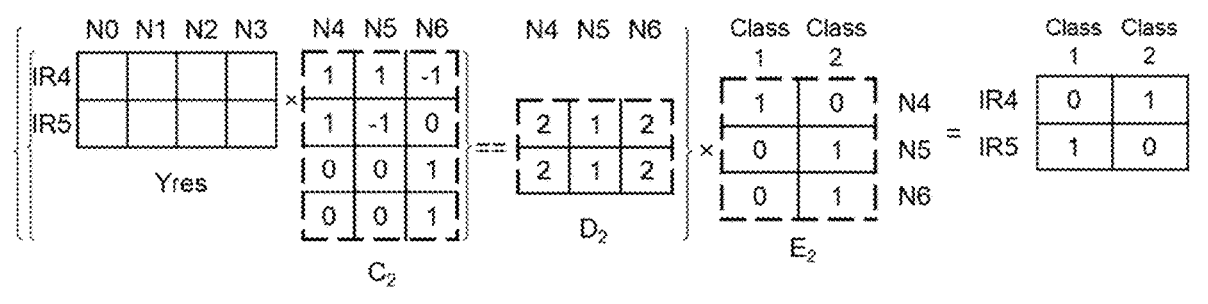

FIGS. 5A and 5B illustrate how input records can be iteratively processed through complementary tensor subsets, by way of a simple example, which assumes that two complementary tensor subsets are formed, consistently with the examples shown in FIGS. 4A-4D. That is, the two complementary tensor subsets respectively correspond to complementary subsets of the leaf nodes, namely the nodes N7 and N8 for the first leaf node subset (see FIG. 5A) and the nodes N4, N5, and N6 for the second node subset, see FIG. 5B. Of course, the number of nodes involved will likely be much larger in practice.

As illustrated in FIG. 5A, all of the input records IR1 . . . IR8 are first processed by performing tensor operations on a first tensor subset, capturing arrays (corresponding to matrices Y, $C_1$, $D_1$, $E_1$ in FIG. 5A) obtained as described above. This makes it possible to obtain first inference results for a first subset of the input records. In the example, the first subset corresponds to input records IR1, IR2, IR3, IR6, IR7, and IR8, for which it was possible to infer a class, as shown in the last table of FIG. 5A. As expected, a result has been obtained for a large fraction (in fact the majority) of the input records. Still, some input records IR4, IR5 remain, for which no inference result has yet been obtained after the first iteration, as indicated by the corresponding patterned fields in the last table. The value 0 is consistently obtained in respect of each of Class 1 and Class 2 for these input records, contrary to the other input records.

For simplicity, the content of matrix Y is not depicted in FIG. 5A as such content depends on the previous operations involving matrices X, A, and B. Moreover, matrix $D_1$ is here defined as a two-dimensional array having identical rows. In variants, however, instead of matrix $D_1$, a single row vector may be used and applied as an element-wise logical operation to each row of the matrix that results from the multiplication operation between matrices Y and $C_1$.

The input records IR4 and IR5 form a second subset (noted Yres in FIG. 5B) of the input records. All of these records are next processed by performing the tensor operations on a second tensor subset, as illustrated in FIG. 5B. The second tensor subset captures arrays corresponding to matrices Yres, $C_2$, $D_2$, and $E_2$ in FIG. 5B. This, eventually, makes it possible to obtain second inference results (see the last table of FIG. 5B) for the second subset of input records (IR4 and IR5). No further iteration is needed in this example, because only two complementary tensor subsets were initially formed.

Again, the content of matrix Yres is not depicted in FIG. 5B, for simplicity; such content depends on the previous operations involving matrices X, A, and B. Note, a single row vector may be used in place of matrix $D_2$, as with matrix $D_1$ of FIG. 5A.

Figure 6A:
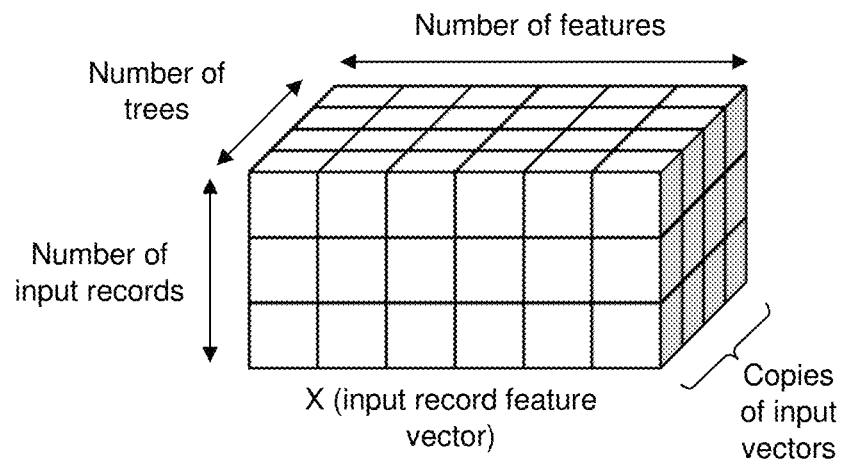
FIGS. 6A and 6B are further diagrams illustrating how the tensor representation can be decomposed into complementary tensor subsets, as in embodiments.
Figure 6B:
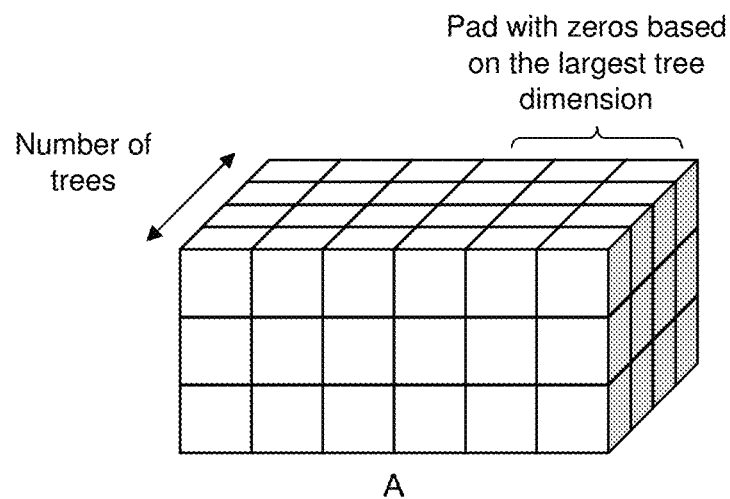

The depictions used in FIGS. 4 and 5 show matrices and vectors, for the sake of understanding. In practice, however, the operations performed rely on tensor subsets, which are captured by data structures. The latter include data that are populated in the main memory of the underlying computer system to perform the required operations. As evoked earlier, the tensor operations may involve 3D tensors, which are zero-padded according to maximal dimensions of the decision trees. The extent of the padding is determined by maximal dimensions of the decision trees. Thus, the resulting tensor objects can be regarded as aggregating multiple arrays, adequately zero-padded to compensate for the differences of dimensions of the decision trees. Example of 3D tensors are shown in FIGS. 6A and 6B. FIG. 6A shows a tensor aggregating features of input records. Each input record correspond to a vector; the set of input records form a matrix, which is duplicated to match the number of trees involved. FIG. 6B shows another tensor aggregating matrices A obtained for the different trees involved. Depending on the implementation, however, the input matrix X may be defined as a 2D array, which is then broadcasted to perform the multiplication with a 3D tensor representation of matrix A, which captures information from all trees of the ensemble, as illustrated in FIG. 6B.

As exemplified earlier, the third arrays may possibly be split S30 according to a unique threshold value with respect to the statistics on the leaf nodes. In the example of FIG. 4A, it is assumed that the successive leaf nodes, once suitably reordered from the most likely node to the less likely node, provide 40%, 25%, 20%, 10%, and 5% of the outcomes. Such percentages reflect statistics obtained with, e.g., training or validation data. The reordered child nodes correspond to nodes N7, N8, N4, N5, and N6 in the example of FIGS. 4A-4D. Thus, imposing a threshold value ensuring, e.g., at least a 60% average hit-rate for the first tensor subset, amounts to split the columns in two groups, where the first group includes columns N7 and N8, while the second group includes columns N4, N5, and N6.

The above example assumes that a same threshold value is applied to all of the decision trees. Several rules may be contemplated to obtain such a threshold. One may for instance use an arbitrary threshold, resulting in first subarrays having a fixed number of columns (the remaining columns being grouped into the second subarrays). A better approach is to seek to obtain a Pareto-like principle, aiming at identifying a minimal number of columns that provide most outcomes, on average. For example, a possibility is to average optimal thresholds as obtained for all of the trees. E.g., use can be made of an algorithm that searches through all the splits to determine the optimal threshold for each tree. Several trees may give rise to different optimal splits, hence the possibility to consider an average threshold value. Yet, if the data are aggregated in a 3D tensor and the operations offloaded to a hardware accelerator, then the best approach may be to split columns according to the operation design of this accelerator. For instance, the accelerator may cause tensor operations to compute on a minimal number of columns. For example, assume that the 3D tensors involved comprise, each, 128 columns in total (adequately zero-padded, where necessary). There, an optimization algorithm may for instance result in an optimal split after the 40th column. Yet, the design of the accelerator may require using a minimal number (e.g., 64) of columns, which number may be at odd with the optimal split value (after the $40^{th}$ column). Notwithstanding this mismatch, it may nevertheless be more efficient to split the subarrays into arrays of 64 columns, each, since the hardware accelerator will anyway perform computations on 64 columns, irrespective of data offloaded to it.

In variants, two or more threshold values may be used, resulting in three or more complementary tensor subsets. For example, the tensor representation built at step S30 may include three complementary tensor subsets. That is, beyond the first and second tensor subsets noted earlier, a third tensor subset is formed, which corresponds to a third leaf node subset. On average, the leaf nodes of the first leaf node subset are more likely to be reached than the leaf nodes of the second leaf node subset, while the leaf nodes of the second leaf node subset are more likely to be reached than the leaf nodes of the third leaf node subset, according to the statistics used to form the complementary subsets. In practice, obtaining three tensor subsets may amount to dividing each of the matrices C, D, and E into three sub-matrices, based on two thresholds.

In that case, a first iteration is performed (step S40, including sub-steps S42-S44), which likely gives rise to identifying residual subsets of input records (earlier referred to as the second subset of input records), for which no inference result has yet been obtained after initially processing S40 all of the input records. A second iteration will then be performed (see steps S50, S60: Yes, and S40), whereby further residual input records are identified, for which no inference result has still been obtained after the second iteration. These form S50 a third subset of the set of input records. Next, a third and last iteration is performed, whereby all of the input records of the third subset are processed S42-S44 by performing the tensor operations on the third tensor subset. This causes to obtain third and final inference results (for the third subset of input records), in accordance with leaf nodes of the third leaf node subset.

As noted earlier, the threshold values may be arbitrarily set, so as to ensure a predetermined number of columns in each subarray. A better approach, however, is to determine an optimal split in the remaining columns of the 3D tensors. A further possibility is, when using hardware accelerators, to take into account design parameters of the accelerator, as noted above.

Thus, two, three, or more, complementary subsets may initially be formed, leading to a corresponding number of iterations S40. Once inference results have been obtained for all of the input records, a final result is formed at step S70. For example, an ensemble inference result may be returned S70 for each of the input records, based on inference results obtained across the successive iterations S40.

Figure 7:
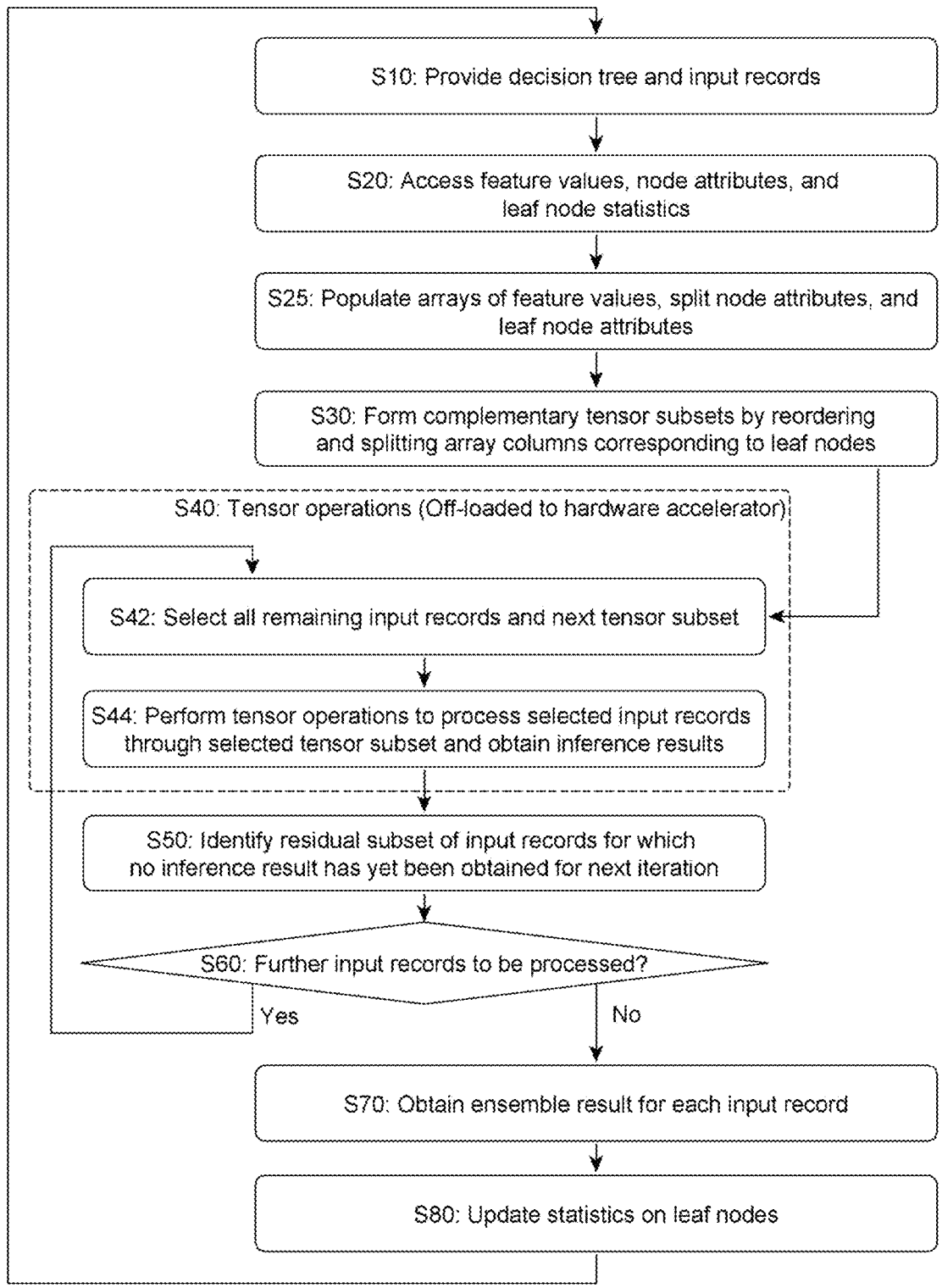
FIG. 7 is a flowchart illustrating high-level steps of a method of performing machine learning inferences, according to embodiments.

A preferred flow is shown in FIG. 7. Decision trees and input records are provided at step S10. The trees are assumed to have already been trained at this point. Feature values of the input records, data related to node attributes, and leaf node statistics are accessed at step S20. Such statistics may have been obtained according to the flow of FIG. 8, described below. Various arrays are populated at steps S25, based on the accessed data. These arrays notably gather feature values, split node attributes, and leaf node attributes. At step S30, complementary tensor subsets are formed based on the populated arrays, notably by reordering and splitting arrays with respect to columns corresponding to leaf nodes of the trees. Tensor operations are then performed at step S40, which includes two sub-steps S42, S44. Namely, all (remaining) input records are selected at step S42, together with the corresponding tensor subset. Then, the tensor operations are offloaded S44 to a hardware accelerator, in order to process the currently selected input records through the corresponding tensor subset. Inference results are accordingly obtained for a subset of the input records. Then, the algorithm identifies S50 the residual subset of input records, i.e., records for which no inference result has yet been obtained. If further input records need be processed (S60: Yes), a next iteration S40 is performed. Eventually (S60: No), inference results are obtained for all input records and an ensemble result is formed at step S70, for each of the input records. If necessary, node statistics are updated at step S80, based on the latest leaf node counts observed.

Figure 8:
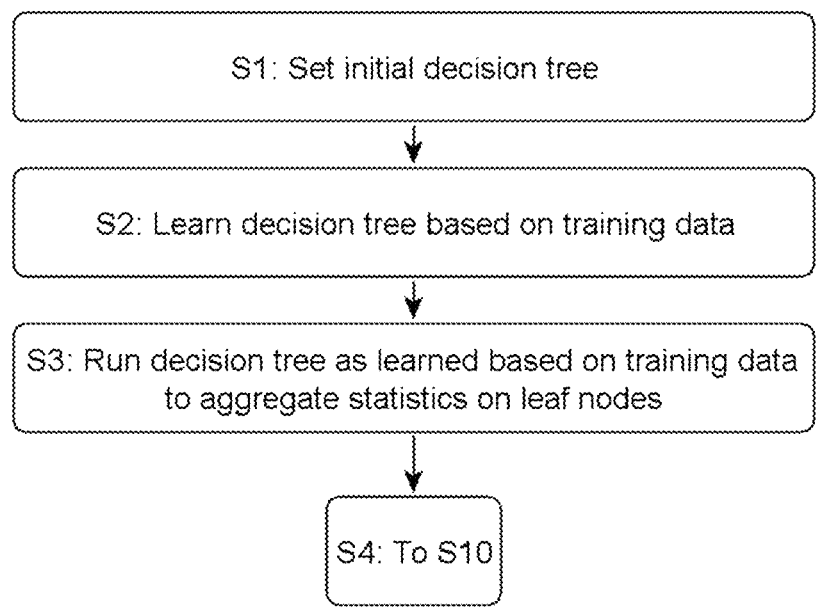
FIG. 8 is another flowchart illustrating how leaf node statistics can be obtained in embodiments.

The statistics accessed at step S20 are pivotal, insofar as they impact the complementary subsets formed. As illustrated in FIG. 8, such statistics can notably be obtained during pre-processing steps. For example, decision trees may initially be set at step S1, with a view to training S2 the decision trees, based on some suitable training set of input records. After that, the decision trees obtained may again be run S3 based on the same training set or a validation set, in order to obtain node statistics, e.g., by measuring counts in each leaf nodes. Moreover, such statistics may possibly be updated at runtime (see step S80 in FIG. 7), while processing new input records. This way, new decompositions of the tensor operation set can be obtained based on updated statistics. I.e., subsequent operations will thus be based on new subsets of tensor operations.

The present methods are all the more advantageous when the maximal tree depth increases, typically when one or more of the decision trees involved have a depth that is larger than or equal to six. In this case, computations related to matrix C are likely to become dominant. This, however, depends on the datasets used. In some cases, the present methods may already show benefits for shallow decision trees. In other cases, the benefits appear where the tree depth is, e.g., equal to or larger than 8.

Next, according to another aspect, the invention can be embodied as a computer program product for performing machine learning inferences. This computer program product comprises a computer readable storage medium having program instructions embodied therewith. The program instructions are executable by processing means 102, 105 of a computerized system 1, 101, such as described below, so as to cause such processing means to perform steps as described earlier in reference to the present methods. In particular, such instructions may cause the computerized system to take advantage of hardware accelerators to perform tensor operations, as discussed earlier.

Figure 9:
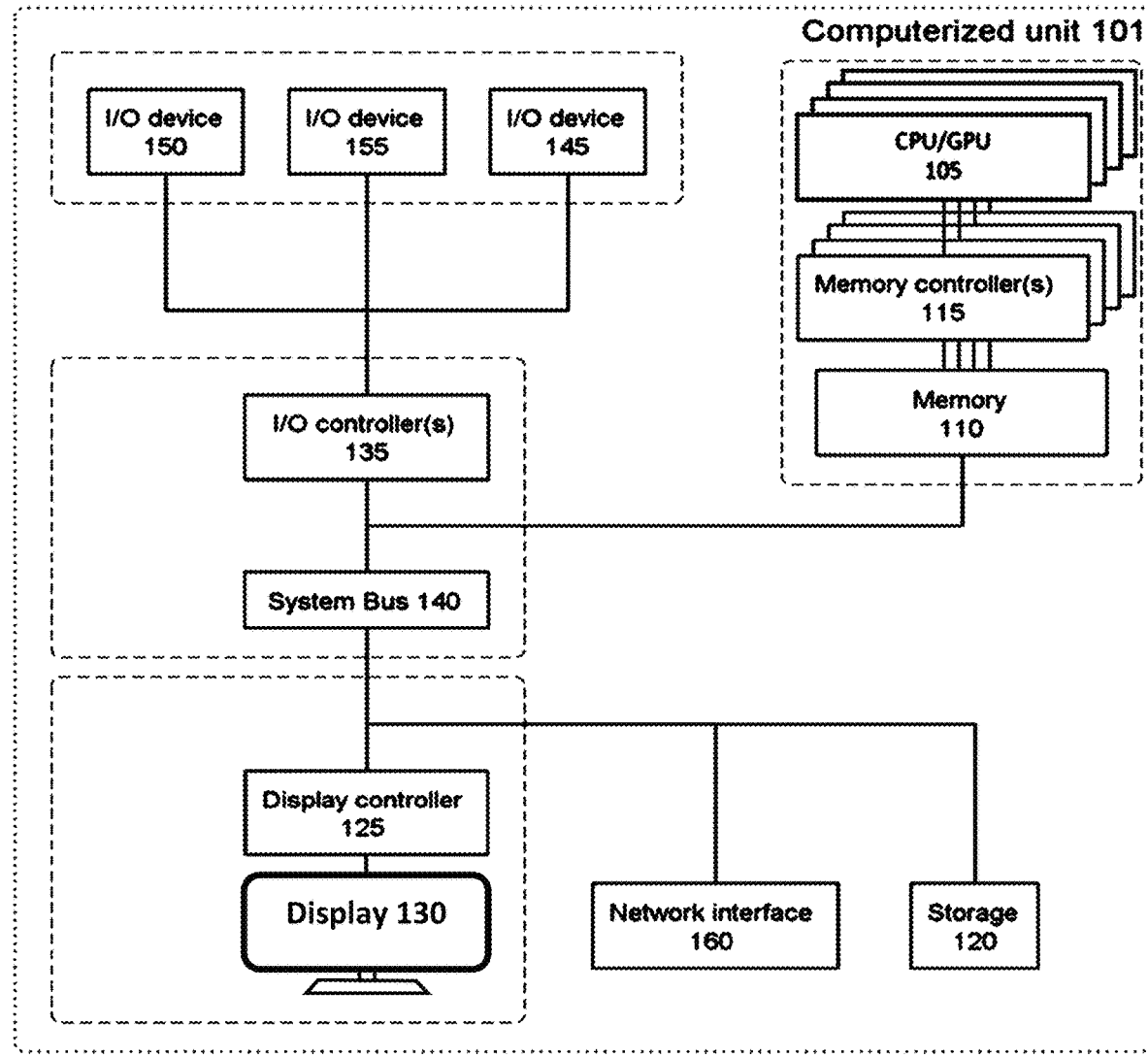
FIG. 9 schematically represents a general-purpose computerized unit, suited for implementing one or more method steps as involved in embodiments.
Figure 10:
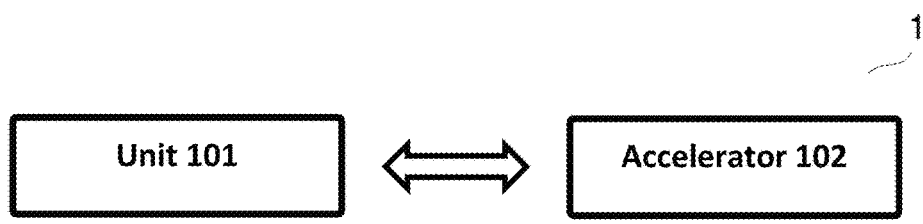
FIG. 10 schematically depicts a computerized system, including a unit such as shown in FIG. 9, as well as a hardware accelerator, to which tensor operations can be offloaded, as in embodiments of the invention.

Referring now to FIGS. 9 and 10, a further aspect of the invention is described, which concerns a computerized system 1, 101 for performing machine learning inferences. The system 1, 101 typically comprises storage means 180, which stores computerized methods (e.g., in the form of software). In operation, such computerized methods can be loaded in the main memory 170, for the processing means 102, 105 to cause to perform steps according to the present methods.

In the example of FIG. 9, the system is a computerized unit 101, the processing means of which includes central processing units (CPUs) and graphics processing units (GPUs), both of which may be used to perform computations required by the present methods. In advantageous variants such as illustrated in FIG. 10, the system 1 includes both a standard computerized unit such as unit 101 shown in FIG. 9 and one or more hardware accelerators 102. In that case, the system 1 may be configured to offload the tensor operations to the one or more hardware accelerators. The latter may notably include FPGAs and/or a dedicated chip, specifically designed for tensor operations.

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

For instance, FIG. 9 schematically represents a computerized unit 101 (e.g., a general- or specific-purpose computer), which may possibly interact with other, similar units, so as to be able to perform steps according to the present methods.

In exemplary embodiments, in terms of hardware architecture, as shown in FIG. 9, each unit 101 includes at least one processor 105, and a memory 170 coupled to a memory controller 115. Several processors (CPUs, and/or GPUs) may possibly be involved in each unit 101. To that aim, each CPU/GPU may be assigned a respective memory controller, as known per se. In variants, controllers of the unit 101 may be coupled to FPGAs or other hardware accelerators, as discussed earlier in reference to FIG. 10.

One or more input and/or output (I/O) devices 145, 150, 155 (or peripherals) are communicatively coupled via a local input/output controller 135. The input/output controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software instructions. The processors 105 can be any custom made or commercially available processor(s). In general, they may involve any type of semiconductor-based microprocessor (in the form of a microchip or chip set), or generally any device for executing software instructions.

The memory 170 typically includes volatile memory elements (e.g., random-access memory), and may further include nonvolatile memory elements. Moreover, the memory 170 may incorporate electronic, magnetic, optical, and/or other types of storage media.

Software in memory 170 may include one or more separate programs, each of which comprises executable instructions for implementing logical functions. In the example of FIG. 9, instructions loaded in the memory 170 may include instructions arising from the execution of the computerized methods described herein in accordance with exemplary embodiments. The memory 170 may further load a suitable operating system (OS), not shown. The OS essentially controls the execution of other computer programs or instructions and provides scheduling, input-output control, file and data management, memory management, and communication control and related services.

Possibly, a conventional keyboard and mouse can be coupled to the input/output controller 135. Other I/O devices 140-155 may be included. The computerized unit 101 can further include a display controller 125 coupled to a display 130. Any computerized unit 101 will typically include a network interface or transceiver 160 for coupling to a network, to enable, in turn, data communication to/from other, external components, e.g., other units 101.

The network transmits and receives data between a given unit 101 and other devices 101. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Preferably though, this network should allow very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

The present invention may thus be a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant, or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method for performing machine learning inferences in a computer system including a hardware accelerator, the inferences performed on a set of input records and based on decision trees, the computer-implemented method comprising:
   building, from data structures populated in a memory of a computerized unit of a computer system, tensor representations of machine learning inferences to be performed by forming complementary tensor subsets that respectively correspond to complementary subsets of leaf nodes of a plurality of decision trees based on statistics of the leaf nodes and on data capturing attributes of the leaf nodes and split nodes of the plurality of decision trees, wherein:
      the complementary tensor subsets are ranked according to statistics reflecting a propensity of individual leaf nodes to be reached such that a first tensor subset and a second tensor subset correspond to a first leaf node subset and a second leaf node subset, respectively, of the complementary subsets of the leaf nodes, and
      the individual leaf nodes of the first leaf node subset are the leaf nodes having a higher propensity to be reached than the leaf nodes of the second leaf node subset according to the statistics and according to the data capturing attributes of the split nodes and the leaf nodes;
   causing, by the computerized unit, tensor operations to be processed by a hardware accelerator in network communication within the computer system;
   processing, by the hardware accelerator, a set of input records by performing the tensor operations on the first tensor subset to obtain a first inference result for a first subset of input records of the set of input records in accordance with the leaf nodes of the first leaf node subset, whereby remaining input records, for which no inference result has yet been obtained, form a second subset of input records; and
   processing, by the hardware accelerator, the second subset of input records by performing the tensor operations on the second tensor subset to obtain a second inference result for the second subset of the input records in accordance with the leaf nodes of the second leaf node subset.

2. The method of claim 1, wherein one or more operations required to process the input records are offloaded to a dedicated chip designed to perform tensor operations.

3. The computer-implemented method of claim 1, further comprising:
   capturing feature values of the input records and further comprising:
      populating from at least the feature values one or more first arrays with the feature values of the input records, one or more second arrays with attributes of the split nodes of the plurality of decision trees, and one or more third arrays with attributes of the leaf nodes; and
   wherein:
      the tensor operations are executed based on operands formed based at least on the one or more first arrays, the one or more second arrays, and the complementary tensor subsets, and
      the complementary tensor subsets are formed based on the third arrays.

4. The computer-implemented method of claim 3, wherein:
one or more columns of the second arrays correspond to the split nodes and the one or more third arrays correspond to the leaf nodes,
the complementary tensor subsets are formed by reordering the columns of the one or more third arrays according to the statistics, and splitting the columns of the one or more third arrays as reordered to obtain one or more complementary subarrays,
the one or more complementary subarrays include one or more first subarrays and one or more second subarrays,
the first tensor subset is formed based on the one or more first subarrays, and
the second tensor subset is formed based on the one or more second subarrays.

5. The computer-implemented method of claim 4, wherein:
the tensor operations are based on 3D tensors, and
the 3D tensors are zero-padded according to maximal dimensions of the plurality of decision trees.

6. The method of claim 4, wherein the one or more third arrays, once reordered, are split according to at least one threshold value with respect to the statistics accessed for the leaf nodes.

7. The computer-implemented method of claim 4, wherein;
the one or more first arrays comprise an array x for each input record of the set of input records, the array x reflecting a row vector X encoding feature values of each input record;
the one or more second arrays comprise at least two arrays for each decision tree of the plurality of decision trees, the at least two arrays including an array a reflecting a matrix A having a number of columns corresponding to a number of split nodes of each decision tree and an array b reflecting a row vector B of first comparands,
the one or more third arrays comprise three arrays for said each decision tree, the three arrays including an array c reflecting a matrix C having a number of columns corresponding to a number of leaf nodes of each decision tree, an array d reflecting a row vector D of second comparands, and an array e reflecting a matrix E encoding potential inference results.

8. The computer-implemented method of claim 1, further comprising:
training the plurality of decision trees based on a training set of input records; and
running the plurality of decision trees based on one of the training set of input records and a validation set of input records to obtain the statistics.

9. The computer-implemented method of claim 1, further comprising:
updating the statistics upon obtaining one or more of the first inference results and the second inference results; and
building an updated tensor representation based on the updated statistics.

10. The computer-implemented method of claim 1, wherein:
the decision trees form an ensemble model; and
further comprising:
obtaining an ensemble inference result for each of the input records based on each of the first inference results and the second inference results.

11. The computer-implemented method of claim 1, wherein:
each of the decision trees is a binary tree, and
each inference result of each of the first set of inference results and the second set of inference results is obtained as a classification result or a regression result.

12. The computer-implemented method of claim 1, wherein:
the tensor representation is built by forming at least three complementary tensor subsets, these including a third tensor subset corresponding to a third leaf node subset of the complementary leaf node subsets, wherein, according to the statistics reflecting the propensity of individual leaf nodes to be reached, the leaf nodes of the second leaf node subset have a higher propensity to be reached than the leaf nodes of the third leaf node subset;
remaining input records, for which no inference result has yet been obtained after processing the input records of the second subset by performing the tensor operations on the second tensor subset, form a third subset of the set of input records; and
further comprising:
processing the input records of the third subset by performing the tensor operations on the third tensor subset to obtain third inference results for the third subset of the input records in accordance with the leaf nodes of the third leaf node subset.

13. The method of claim 1, wherein at least one decision tree of the decision trees has a depth that is larger than or equal to six.

14. The computer-implemented method of claim 1, wherein the statistics are based on respective numbers of times the leaf nodes of corresponding of decision trees are reached upon running the plurality of decision trees.

15. The computer-implemented method of claim 1, wherein the statistics are based on decision paths in the plurality of decision trees, which are translated into individual statistics of sole leaf nodes.

16. The computer-implemented method of claim 1, wherein the propensity of individual leaf nodes to be reached is based on a ranking of available decision paths to a given leaf node from most probably path to least probable path.

17. A computer system for performing machine learning inferences, the inferences performed on a set of input records and based on decision trees, the computer system comprising:
one or more computerized units including one or more computer processors;
a hardware accelerator in network communication with the one or more computerized units;
one or more computer readable storage media; and
program instructions stored on the one or more computer readable storage media for execution by at least one of the one or more computer processors, the program instructions comprising:
program instructions to build, from data structures populated in a memory of a computerized unit of the computer system, tensor representations of machine learning inferences to be performed by forming complementary tensor subsets that respectively correspond to complementary subsets of leaf nodes of a plurality of decision trees based on statistics of the leaf nodes and on data capturing attributes of the leaf nodes and split nodes of the plurality of decision trees, wherein:

the complementary tensor subsets are ranked according to statistics reflecting a propensity of individual leaf nodes to be reached such that a first tensor subset and a second tensor subset correspond to a first leaf node subset and a second leaf node subset, respectively, of the complementary subsets of the leaf nodes, and the individual leaf nodes of the first leaf node subset are the leaf nodes having a higher propensity to be reached than the leaf nodes of the second leaf node subset according to the statistics and according to the data capturing attributes of the split nodes and the leaf nodes;

program instructions to cause, by the computerized unit, tensor operations to be processed by the hardware accelerator;

program instructions to process, by the hardware accelerator, a set of input records by performing the tensor operations on the first tensor subset to obtain a first inference result for a first subset of input records in accordance with the leaf nodes of the first leaf node subset, whereby remaining input records, for which no inference result has yet been obtained, form a second subset of input records; and program instructions to process, by the hardware accelerator, the second subset of input records by performing the tensor operations on the second tensor subset to obtain a second inference result for the second subset of the input records in accordance with the leaf nodes of the second leaf node subset.

18. The computer system of claim 17, wherein the hardware accelerator includes a dedicated chip, designed for tensor operations.

19. A computer program product for performing machine learning inferences in a computer system including a hardware accelerator, the inferences performed on a set of input records and based on decision trees, the computer program product comprising:

one or more computer readable storage media; and program instructions stored on the one or more computer readable storage media, the program instructions comprising:

program instructions to build, from data structures populated in a memory of a computerized unit of a computer system, tensor representations of machine learning inferences to be performed by forming complementary tensor subsets that respectively correspond to complementary subsets of leaf nodes of a plurality of decision trees based on statistics of the leaf nodes and on data capturing attributes of the leaf nodes and split nodes of the plurality of decision trees, wherein:

the complementary tensor subsets are ranked according to statistics reflecting a propensity of individual leaf nodes to be reached such that a first tensor subset and a second tensor subset correspond to a first leaf node subset and a second leaf node subset, respectively, of the complementary subsets of the leaf nodes, and the individual leaf nodes of the first leaf node subset are the leaf nodes having a higher propensity to be reached than the leaf nodes of the second leaf node subset according to the statistics and according to the data capturing attributes of the split nodes and the leaf nodes;

program instructions to cause, by the computerized unit, tensor operations to be processed by a hardware accelerator in network communication within the computer system;

program instructions to process, by the hardware accelerator, a set of input records by performing the tensor operations on the first tensor subset to obtain a first inference result for a first subset of input records in accordance with the leaf nodes of the first leaf node subset, whereby remaining input records, for which no inference result has yet been obtained, form a second subset of input records; and program instructions to process, by the hardware accelerator, the second subset of input records by performing the tensor operations on the second tensor subset to obtain a second inference result for the second subset of the input records in accordance with the leaf nodes of the second leaf node subset.

\* \* \* \* \*